United States Patent Office 3,372,034
Patented Mar. 5, 1968

3,372,034
STARCH COMPOSITIONS AND IMPROVEMENT
OF FOOD WITH SAME
John J. Magic, Markham, Ill., and Robert F. Frost, Griffith, Ind., assignors to American Maize-Products Company, a corporation of Maine
No Drawing. Filed Mar. 26, 1963, Ser. No. 267,954
16 Claims. (Cl. 99—83)

This invention relates to starch compositions and to the improvement of fat-containing foods with such compositions.

Starch is an inherent or added component of a vast number of food formulations but, in certain respects, starch lacks one or more properties which would be of decided advantage in foods. Among these are the capacity to hold fats or oils in uniform suspension and to achieve a high viscosity, after being cooked and cooled, without forming a rigid gel structure. For example, foods such as gravies, sauces, soups, stews, creamed vegetables and batters almost always contain fats or oils, and though there may be a problem of separation of the fat or oil into a separate layer, the addition of ordinary starch will not overcome the problem. Furthermore, while small amounts of cooked starch are often used to thicken liquid or semi-liquid foods, upon cooling the food will ordinarily set into a soft, inhomogeneous mass having jelly-like lumps mixed with the more fluid portions due to the gel-forming tendency of the starch and this is frequently objectionable.

We have now discovered certain new starch compositions comprising admixtures of starch and small amounts of finely divided, synthetic sodium silico aluminate particles which compositions have the capacity to maintain fats and oils in uniform suspension in foods in a superior manner not heretofore possible with starch alone. As a matter of fact, the fat suspending capacity of these new compositions is some form of synergistic phenomenon since by actual tests we have found that this capacity exceeds the sum of the separate fat-suspending powers of each of the two components of the compositions, starch and sodium silico aluminate particles, alone. Furthermore, when the mixture of starch and sodium silico aluminate is cooked in water under gelatinizing conditions and then cooled, a substantial increase in viscosity is achieved without any tendency on the part of the thickened liquid to set up or become immobilized in a gel.

These unique properties of the starch-sodium silico aluminate compositions make them especially useful in foods. By maintaining fats or oils uniformly suspended in foods containing them, the novel compositions improve considerably the texture, consistency and flavor of such foods. Furthermore, due to the synergistic fat-suspending capacity of the novel compositions, lesser amounts of the compositions can generally be used than the excessive amount of starch that would otherwise be necessary to achieve a comparable effect. Where it is desired to thicken liquid or semi-liquid foods, small amounts of the compositions provided by the invention can be added for this purpose without any problems as to loss of homogeneity of the food by formation of gels or jelly-like lumps. The unique properties of the new starch-sodium silico aluminate compositions can also be advantageously used in other non-food applications as will be evident to those skilled in the art.

In making the compositions of our invention, it is necessary to use a synthetic sodium silico aluminate obtained by reacting water soluble salts of aluminum and a strong acid with water soluble sodium silicates. By reacting these salts at very dilute aqueous concentrations and under vigorous agitation, water insoluble particles of the reaction product are precipitated in very finely-divided form, substantially all of the particles being less than one micron in diameter and preferably averaging less than one-half micron in diameter. Such particles contain oxides of sodium ($Na_2O$), aluminum ($Al_2O_3$) and silicon ($SiO_2$) in varying mol ratios, depending on the actual concentrations and the actual aluminum and sodium silicate salts which are employed in the reaction. Specific details of carrying out the reaction and forming the synthetic sodium silico aluminate particles are described in U.S. Patents 2,739,073 and 2,848,346.

For the purpose of our invention, synthetic sodium silico aluminate particles containing oxides of sodium, aluminum and silicon in such proportions that the mol ratio of $Na_2O$ to $Al_2O_3$ is from about 0.8:1 to 1.3:1 and the mol ratio of $SiO_2$ to $Na_2O$ is from about 4:1 to 16:1, substantially all of the particles being less than one micron in diameter and preferably averaging less than one-half micron in diameter, may be employed. If the pH of such particles in water is not already neutral (7.0), it is preferred to adjust the pH to the neutral point with non-toxic edible acids such as citric or phosphoric acids. These particles may be readily prepared by following the procedures described in the above-mentioned U.S. patents and are also sold commercially under the trademark Zeolex.

The requirement that the sodium silico aluminate particles be of synthetic origin is extremely important. We have attempted to duplicate the unique results achieved with the mixtures of starch and synthetic sodium silico aluminate particles by using certain naturally-occurring clays which also contain oxides of sodium, aluminum, and silicon, in one or two instances even in comparable mol ratios, but the natural materials are not satisfactory. Thus, owing perhaps to the particle size and other qualities of the synthetic material which though not completely understood are undoubtedly inherent attributes of the synthetic method of production, the synthetic particles are uniquely suitable for our invention while natural materials of superficial similarity are not.

The synthetic sodium silico aluminate particles, having the above-specified characteristics, may be mixed with all forms of starch, both modified and unmodified, in forming the compositions of our invention. For example, unmodified starch derived from corn, potato, wheat, sago, tapioca or arrowroot or mixtures thereof may be employed. Also, modified starches such as those which have been bleached, oxdized, etherified, esterified, cross-linked, acid-treated or derivatized with anionic and cationic groups or mixtures thereof may be used. For forming dry mixtures with the synthetic sodium silico aluminate particles, the starch may be used in its usual granule form in any desired granule size.

As for proportions, only a small amount of the synthetic sodium silico aluminate particles need be mixed with the starch to achieve the benefits of our invention. As little as about 0.1% of the particles based on the weight of the starch will be effective and the amount of partciles can be progressively increased up to about, say, 5% based on the weight of the starch. As a matter of fact, there is no actual limit on the maximum amount of the synthetic particles as we have used as high as 15% with good results. However, use of more than about 5% of the particles does not give any significant additional advantages to speak of and is ordinarily wasteful. Accordingly, for virtually all practical applications, use of from about 0.1% to 5% of the synthetic sodium silico aluminate particles based on the weight of the starch will be satisfactory and these amounts are therefore preferred, though higher amounts, if desired, can be used.

In mixing the sodium silico aluminate particles with the starch, a uniform admixture is of course desirable and any known means or methods for blending dry particulate ingredients together may be employed for this purpose.

The compositions of our invention may be used in place of the conventional starch which is used in any known food recipe, in the same or different amounts. The compositions may also be added to foods which do not ordinarily contain starch, particularly where the food includes a fat or oil and it is desired to improve the texture, consistency and flavor of the food, or where thickening of a liquid or semi-liquid food is desired. Due to the great variety and number of foods, and to the varying amounts of starch that may be used in each, it is not meaningful, practically speaking, to attempt to define specific proportions in which the compositions of our invention should be added to foods. The range of variation will for the most part depend on the individual tastes and desires of the one preparing or consuming the foods which have been improved with the compositions of our invention.

Further details of our invention are illustrated in the following examples which represent preferred embodiments thereof. Unless otherwise indicated, all proportions and parts specified are by weight.

Example 1

In this example, the fat-suspending capacity of a variety of starch compositions was compared with that of similar compositions to which were added various amounts of synthetic sodium silico aluminate particles prepared by the methods described in the above-mentioned U.S. patents. Substantially, all of the particles were less than one micron in diameter and contained oxides of sodium, aluminum and silicon in the proportions of about 0.83 mol $Na_2O$ for each mol of $Al_2O_3$ and about 12 moles $SiO_2$ for each mole of $Na_2O$.

The fat suspending capacity of each composition was determined by means of a fat folding test which consists of slurrying 6.25 g. of the composition to be tested in 198 ml. of water and heating the slurry to 190° F. with stirring until the starch is gelatinized. Then 30 ml. of liquid hot rendered fat is added to the starch suspension with agitation and the mixture is permitted to stand. Visual observations will then show whether the composition has good fat-suspending capacity, in which case the added fat will remain uniformly dispersed throughout the aqueous starch suspension, or poor fat-suspending capacity, in which event the added fat will separate from the suspension and rise to the top to form a separate layer.

The following specific compositions were tested and the results are noted in the table appearing below:

A. 5.0 g. of waxy corn starch cross-linked with phosphorous oxychloride and 1.25 g. of unmodified corn stach were blended together and a fat-folding test was run. 0.1 g. of the unmodified corn starch of a similar blend was replaced with sodium silico aluminate particles described and a fat-folding test was run.

B. The blend first-described in A was made up again and subjected to the fat-folding test. 0.05 g. of the unmodified corn starch of a similar blend was replaced with the sodium silico aluminate particles and a fat-folding test was then run.

C. The blend first described in A was made up again and subjected to the fat-folding test. This time 0.016 g. of a similar blend was replaced with the sodium silico aluminate particles and a fat-folding test was then run.

D. A fat-folding test was run on 6.25 g. of the waxy corn starch cross-linked with phosphorus oxychloride. 0.125 g. of another 6.25 g. batch of this starch was replaced with the sodium silico aluminate particles and another fat-folding test was run.

| Composition | Fat Folding Test | |
| --- | --- | --- |
| | Without sodium silico aluminate | With sodium silico aluminate |
| A | Poor | Good |
| B | Poor | Good |
| C | Poor | Good |
| D | Poor | Good |

As will be noted, in every instance where the sodium silico aluminate particles were included, the starch compositions were capable of holding the rendered fat added thereto in uniform and stable dispersion. On the other hand, the added fat could not be maintained dispersed and separated as a layer in the same compositions which lacked the sodium silico aluminate particles.

Example 2

In this example certain tests were made to determine the fat-retaining capacity of starch alone, sodium silico aluminate particles alone and a mixture of starch and sodium silico aluminate particles. Starch slurried in water in a concentration simulating a baking batter was used and into these batters was mixed a predetermined amount of fat. Thereafter the fat was extracted in accordance with the Mojonnier extraction method using petroleum ether and ethyl ether as the fat solvents. The percentage of fat extracted from and retained by each composition was noted and recorded.

Three compositions were made up using ordinary starch, the sodium silico aluminate particles described in Example 1, and hot liquid fat. In the first composition, the fat was mixed into a simulated batter consisting of ordinary corn starch and about 1.5% sodium silico aluminate particles based on the weight thereof, suspended in water. In the second composition, the fat was mixed into the same amount of starch suspended in water but without the sodium silico aluminate particles, and in the third composition the fat was mixed into the same amount of sodium silico aluminate particles suspended in water but without the starch. The result of fat extraction from these three compositions are given in the following table:

| Composition | $H_2O$ (cc.) | Starch (gm.) | Sodium Silico Aluminate (gm.) | Fat (gm.) | (Mojonnier) Percent Fat Extracted | Percent Fat Retained |
| --- | --- | --- | --- | --- | --- | --- |
| A | 19.8 | 0.625 | 0.01 | 2.4962 | 96.7 | 3.3 |
| B | 19.8 | 0.625 | 0 | 2.4962 | 98.2 | 1.8 |
| C | 19.8 | 0 | 0.01 | 2.4962 | 99.2 | 0.8 |

As is evident, the percentage of fat that could be extracted from the batter containing starch, sodium silico aluminate particles and fat was the lest of all of the compositions and correspondingly this batter retained more fat than any of the other compositions. Furthermore, the amount of fat that was retained by the batter containing starch and sodium silico aluminate particles was greater than the sum of the fat contents separately retained by the starch and sodium silico aluminate particles alone. Thus, it is quite apparent that some form of synergistic activity takes place when the combination of starch and sodium silico aluminate particles comes into contact with fats. This demonstrates the benefits of using the starch-sodium silico aluminate composition in fat-containing foods whereby the fats can be maintained in stable and uniform dispersions.

Example 3

In this example the viscosity characteristics and the gel tendencies of starch compositions containing sodium silico aluminate particles were evaluated and compared with similar starch compositions lacking the sodium silico aluminate particles. Each composition was tested by slurrying 25 g. of the starch composition in 425 ml. of water and then cooking the slurry at 190° F. until the starch was gelatinized. Each composition was then poured into a can which was sealed and autoclaved for one hour at 244° F. and 15 p.s.i. pressure. The sealed can was then cooled and permitted to stand for 24 hours. This can was then opened and a viscosity determination made on its contents using a Bostwick Consistomitor unit.

This is a known testing apparatus used in the starch industry, which in general description consists of a dam having a sluice gate therein which can be opened for releasing the starch material held back by the dam. A trough leads away from the gate and is marked with an arbitrary scale using selected units of length. These units are known as Bostwick units. The maximum distance that a starch composition travels out along the trough leading from the gate, in a predetermined time and at a controlled temperature, is a measure of the viscosity and gel characteristics of the starch composition. Of course the higher the viscosity, the less it will flow out along the trough and the lower will be the Bostwick reading.

In the tests we made, the Bostwick reading was taken precisely one minute after the gate in the dam was opened. In addition to the Bostwick viscosity, a record was also made of whether any gels were formed in any of the test compositions. The sodium silico aluminate particles used were substantially of less than one micron in diameter and contained oxides of sodium, aluminum and silicon in the proportions of about 0.91 mole $Na_2O$ to one mol $Al_2O_3$ and about 12 moles $SiO_2$ to 1 mol $Na_2O$. Starch compositions alone and similar compositions containing various concentrations of starch sodium silico aluminate particles were autoclaved and subjected to the Bostwick viscosity test as described above and the results are recorded in the following table:

|  | Without Sodium Silico Aluminate | | With Sodium Silico Aluminate (SSA) Added | | | | | | | |
|---|---|---|---|---|---|---|---|---|---|---|
|  | | | ¼% SSA Added | | ½% SSA Added | | 1% SSA Added | | 2% SSA Added | |
| Sample | Gel | Bostwick | Gel | Bostwick | Gel | Bostwick | Gel | Bostwick | Gel | Bostwick |
| A | Yes | 10.5 | No | 8.75 | No | 8.25 |  |  | No | 7.0 |
| B | Yes | 9.5 | No | 7.25 | No | 7.25 |  |  | No | 7.5 |
| C | No | 9.0 | No | 8.0 | No | 8.0 |  |  |  |  |
| D | Yes | 9.0 |  |  |  |  | No | 7.5 | No | 6.5 |
| E | Yes | 9.0 |  |  |  |  | No | 8.0 | No | 7.5 |
| F | Yes | 8.75 |  |  |  |  | No | 7.5 | No | 7.0 |
| G | Yes | 8.5 |  |  |  |  | No | 7.5 | No | 6.5 |

As will be seen, in every case but one the starch compositions which lacked sodium silico aluminate particles set up into a runny gel after being autoclaved in sealed cans. Such compositions in fact lacked homogeneity and contained masses or lumps of jelly-like consistency mixed with more fluid portions which were able to flow a considerable distance and give a high Bostwick reading although not all portions of the compositions were of such low viscosity. In contrast, each time the sodium silico aluminate particles were added, in varying concentrations, the Bostwick viscosity was lowered substantially showing that the starch compositions were uniformly and homogeneously thickened to an appreciable extent and without any tendency toward inhomogeneous formation of gel-like compositions. This illustrates the great value of the compositions containing the sodium silico aluminate particles when used to thicken liquid and semi-liquid foods.

*Example 4*

In this example, a typical spaghetti sauce was made using a starch composition containing 0.5% of the sodium silico aluminate particles described in Example 2. The ingredients used to form the sauce were as follows:

| | Parts |
|---|---|
| Onions (diced) | 113 |
| Garlic (minced) | 3 |
| Beef fat | 56.6 |
| Ground hamburger | 452.8 |
| Tomato paste | 340 |
| Salt | 22 |
| Tomato puree | 251 |
| $H_2O$ | 600 |
| Starch plus 0.5% sodium silico aluminate | 25 |
| Sugar | 5 |
| Red pepper | 1 |

The onions, garlic and meat were browned in the beef fat. Thereafter the tomato paste, salt, tomato puree, water, starch, sugar and red pepper were heated to 190° F. after which the meat, onions, garlic and beef fat were added to the heated aqueous phase of the sauce and simmered therein for ten minutes. The entire mixture was then autoclaved for forty-five minutes at 245° F. and 15 pounds p.s.i. pressure.

The final sauce had an excellent texture, flavor and consistency, was suitably thick and homogeneous, and upon standing showed no tendency toward separation of the beef fat or of formation of a gel.

It will be understood that it is intended to cover all changes and modifications of the preferred embodiments of the invention, herein chosen for the purpose of illustration, which do not depart from the spirit and scope of the invention.

We claim:
1. A composition particularly suitable for improving fat-containing foods which comprises starch and in admixture therewith at least about 0.1% based on the weight of said starch of particles of a synthetic compound containing oxides of sodium ($Na_2O$), aluminum ($Al_2O_3$) and silicon ($SiO_2$) in the proportions of about 0.8 to 1.3 moles $Na_2O$ for each mol of $Al_2O_3$ and about 4 to 16 moles $SiO_2$ for each mol of $Na_2O$, substantially all of said particles being less than one micron in diameter.

2. A composition in accordance with claim 1 in which said particles are present in amounts within the range from about 0.1% to about 5% based on the weight of said starch.

3. A composition in accordance with claim 1 in which said particles average about one-half micron in diameter.

4. A composition in accordance with claim 1 combined with water.

5. A composition particularly suitable for improving fat-containing foods which comprises an aqueous slurry of starch and in admixture therewith from about 0.1% to about 5% based on the weight of said starch of particles of a synthetic compound containing oxides of sodium ($Na_2O$), aluminum ($Al_2O_3$) and silicon ($SiO_2$) in the proportions of about 0.8 to 1.3 moles $Na_2O$ for each mol of $Al_2O_3$ and about 4 to 16 moles $SiO_2$ for each mol of $NaO_2$, subsantially all of said particles being less than one micron in diameter.

6. A composition in accordance with claim 5 in which said starch is gelatinized starch.

7. A composition particularly suitable for improving fat-containing foods which comprises a waxy corn starch cross-linked with phosphorus oxychloride and in admixture therewith from about 0.1% to about 5% based on the weight of said starch of particles of a snythetic compound containing oxides of sodium ($Na_2O$), aluminum ($Al_2O_3$) and silicon ($SiO_2$) in the proportions of about 0.83 mole $Na_2O$ for each mol of $Al_2O_3$ and about 12 moles $SiO_2$ for each mol of $Na_2O$, substantially all of said particles being less than one micron in diameter.

8. A composition in accordance with claim 7 which includes unmodified corn starch in substitution for a minor portion of said cross-linked starch.

9. An improved food composition which comprises starch, at least about 0.1% based on the weight of said starch and in admixture therewith of particles of a synthetic compound containing oxides of sodium ($Na_2O$), aluminum ($Al_2O_3$) and silicon ($SiO_2$) in the proportions of about 0.8 to 1.3 moles $Na_2O$ for each mol of $Al_2O_3$ and about 4 to 16 moles $SiO_2$ for each mol of $Na_2O$, substantially all of said particles being less than one micron in diameter, and an edible food.

10. A composition in accordance with claim 9 in which said particles are present in amounts within the range from about 0.1% to about 5% based on the weight of said starch.

11. A composition in accordance with claim 9 in which said particles average about one-half micron in diameter.

12. The method of improving a food containing a minor proportion of fat which comprises adding to such food a mixture of starch and at least about 0.1% based on the weight of said starch of particles of a synthetic compound containing oxides of sodium ($Na_2O$), aluminum ($Al_2O_3$) and silicon ($SiO_2$) in the proportions of about 0.8 to 1.3 moles $Na_2O$ for each mol of $Al_2O_3$ and about 4 to 16 moles $SiO_2$ for each mol of $Na_2O$, substantially all of said particles being less than one micron in diameter.

13. The method in accordance with claim 12 in which said particles are present in amounts within the range of from about 0.1% to about 5% based on the weight of said starch.

14. The method in accordance with claim 12 in which said mixture is slurried in water before being added to said food.

15. The method in accordance with claim 14 in which said slurry is heated and the starch of said mixture is thereby gelatinized before being added to said food.

16. A food composition comprising a minor proportion of fat and as an essential ingredient thereof starch in admixture with at least about 0.1% based on the weight of said starch of particles of a synthetic compound containing oxides of sodium ($Na_2O$), aluminum ($Al_2O_3$) and silicon ($SiO_2$) in the proportions of about 0.8 to 1.3 mols $Na_2O$ for each mol of $Al_2O_3$ and about 4 to 16 mols of $SiO_2$ for each mol of $Na_2O$, substantially all of said particles being less than one micron in diameter.

References Cited
UNITED STATES PATENTS

| | | | |
|---|---|---|---|
| 2,848,346 | 8/1958 | Bertorelli | 106—288 |
| 2,909,431 | 10/1959 | Keller | 99—139 X |

A. LOUIS MONACELL, *Primary Examiner.*

B. H. STRIZAK, *Examiner.*

J. M. HUNTER, *Assistant Examiner.*